(12) United States Patent
Elias

(10) Patent No.: US 11,036,307 B2
(45) Date of Patent: Jun. 15, 2021

(54) TOUCH SENSITIVE MECHANICAL KEYBOARD

(71) Applicant: Apple Inc., Cupertino, CA (US)

(72) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/802,401

(22) Filed: Feb. 26, 2020

(65) Prior Publication Data

US 2020/0192490 A1 Jun. 18, 2020

Related U.S. Application Data

(63) Continuation of application No. 12/333,793, filed on Dec. 12, 2008, now Pat. No. 10,585,493.

(51) Int. Cl.
*G06F 3/02* (2006.01)
*G06F 3/0488* (2013.01)

(52) U.S. Cl.
CPC .......... *G06F 3/0202* (2013.01); *G06F 3/0488* (2013.01)

(58) Field of Classification Search
CPC ............................. G06F 3/0202; G06F 3/0488
See application file for complete search history.

(56) References Cited

U.S. PATENT DOCUMENTS

| | | | |
|---|---|---|---|
| 4,188,136 A | 2/1980 | Bedocs | |
| 4,387,367 A | 6/1983 | Fisher | |
| 4,417,294 A | 11/1983 | Herron, Jr. | |
| 5,189,403 A * | 2/1993 | Franz | G05G 9/047 345/168 |
| 5,269,004 A | 12/1993 | Comerford et al. | |
| 5,341,133 A | 8/1994 | Savoy et al. | |

(Continued)

FOREIGN PATENT DOCUMENTS

| | | |
|---|---|---|
| CN | 1430235 A | 7/2003 |
| CN | 1882904 A | 12/2006 |

(Continued)

OTHER PUBLICATIONS

Non-Final Office Action received for U.S. Appl. No. 16/415,657, dated Oct. 6, 2020, 21 pages.

(Continued)

*Primary Examiner* — Amine Benlagsir
(74) *Attorney, Agent, or Firm* — Kubota & Basol LLP

(57) ABSTRACT

A touch sensitive mechanical keyboard configured to enable a standard look and feel mechanical keyboard to sense fine hand/finger motion over the surface of the keys. Command and cursor input (e.g., pointing and gestures) can be received from the user on the touch sensitive mechanical keyboard without requiring the user to move the user's hand off the keyboard. Fine hand/finger motion detection can be enabled by embedding clusters of capacitive sensors near the surface of the keyboard's keys. The touch sensitive mechanical keyboard can operate in two or more modes—e.g., a typing mode and a mouse mode—and operating the keyboard in mouse mode or switching between the modes can be facilitated by holding (depressing and holding) or tapping (depressing and releasing) arbitrary combinations of keys, or by detecting the number of fingers touching the touch sensitive mechanical keyboard.

24 Claims, 9 Drawing Sheets

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,581,243 A | 12/1996 | Ouellette et al. |
| 5,675,361 A * | 10/1997 | Santilli ............... G06F 3/0213 |
| | | 345/156 |
| 5,707,160 A | 1/1998 | Bowen |
| 5,736,976 A | 4/1998 | Cheung |
| 5,745,719 A | 4/1998 | Falcon |
| 5,821,922 A | 10/1998 | Sellers |
| 5,825,352 A | 10/1998 | Bisset et al. |
| 5,835,079 A | 11/1998 | Shieh |
| 5,880,411 A | 3/1999 | Gillespie et al. |
| 5,982,302 A | 11/1999 | Ure |
| 6,188,391 B1 | 2/2001 | Seely et al. |
| 6,204,839 B1 | 3/2001 | Mato, Jr. |
| 6,310,610 B1 | 10/2001 | Beaton et al. |
| 6,323,846 B1 | 11/2001 | Westerman et al. |
| 6,377,685 B1 | 4/2002 | Krishnan |
| 6,504,530 B1 | 1/2003 | Wilson et al. |
| 6,518,958 B1 | 2/2003 | Miyajima et al. |
| 6,529,186 B1 | 3/2003 | Thayer |
| 6,690,387 B2 | 2/2004 | Zimmerman et al. |
| 7,015,894 B2 | 3/2006 | Morohoshi |
| 7,091,954 B2 * | 8/2006 | Iesaka ............... G06F 1/1616 |
| | | 345/156 |
| 7,184,064 B2 | 2/2007 | Zimmerman et al. |
| 7,383,457 B1 | 6/2008 | Knight |
| 7,428,142 B1 | 9/2008 | Ligtenberg et al. |
| 7,659,887 B2 | 2/2010 | Larsen et al. |
| 7,663,607 B2 | 2/2010 | Hotelling et al. |
| 7,952,038 B1 | 5/2011 | Ando et al. |
| 7,952,566 B2 | 5/2011 | Poupyrev et al. |
| 8,479,122 B2 | 7/2013 | Hotelling et al. |
| 8,581,870 B2 | 11/2013 | Bokma et al. |
| 8,860,693 B2 | 10/2014 | Elias |
| 8,933,905 B2 | 1/2015 | Bokma et al. |
| 9,041,652 B2 | 5/2015 | Elias et al. |
| 9,400,581 B2 | 7/2016 | Bokma et al. |
| 9,454,239 B2 | 9/2016 | Elias |
| 9,785,251 B2 | 10/2017 | Martisauskas |
| 9,851,800 B1 | 12/2017 | Kneisley et al. |
| 9,904,410 B2 | 2/2018 | Bokma et al. |
| 2002/0171633 A1 | 11/2002 | Brinjes |
| 2002/0175901 A1 | 11/2002 | Gettemy |
| 2003/0025679 A1 | 2/2003 | Taylor et al. |
| 2003/0116419 A1 | 6/2003 | Anzai |
| 2003/0201982 A1 | 10/2003 | Iesaka |
| 2003/0205450 A1 | 11/2003 | Divigalpitiya et al. |
| 2004/0183786 A1 | 9/2004 | Jam |
| 2005/0174260 A1 | 8/2005 | Arneson et al. |
| 2005/0262882 A1 | 12/2005 | Moon |
| 2006/0026521 A1 | 2/2006 | Hotelling et al. |
| 2006/0097991 A1 | 5/2006 | Hotelling et al. |
| 2006/0187212 A1 | 8/2006 | Park et al. |
| 2006/0197753 A1 | 9/2006 | Hotelling |
| 2006/0232557 A1 | 10/2006 | Fallot-Burghardt |
| 2006/0238510 A1 | 10/2006 | Panotopoulos et al. |
| 2006/0255971 A1 | 11/2006 | Kim |
| 2007/0063976 A1 * | 3/2007 | Oga ............... H04M 1/23 |
| | | 345/168 |
| 2007/0120828 A1 | 5/2007 | Fyke |
| 2007/0146334 A1 | 6/2007 | Inokawa |
| 2007/0152975 A1 | 7/2007 | Ogihara et al. |
| 2008/0001787 A1 | 1/2008 | Smith et al. |
| 2008/0006453 A1 | 1/2008 | Hotelling |
| 2008/0024459 A1 | 1/2008 | Poupyrev et al. |
| 2008/0106519 A1 | 5/2008 | Murray |
| 2008/0158172 A1 | 7/2008 | Hotelling et al. |
| 2008/0158181 A1 | 7/2008 | Hamblin et al. |
| 2008/0162996 A1 | 7/2008 | Krah et al. |
| 2008/0202824 A1 | 8/2008 | Philipp et al. |
| 2008/0225006 A1 | 9/2008 | Ennadi |
| 2008/0284736 A1 * | 11/2008 | Trent, Jr. ............... G06F 3/023 |
| | | 345/168 |
| 2008/0297475 A1 | 12/2008 | Woolf et al. |
| 2008/0309522 A1 | 12/2008 | Larsen et al. |
| 2009/0000936 A1 | 1/2009 | Steijner |
| 2009/0002199 A1 | 1/2009 | Lainonen et al. |
| 2009/0027347 A1 | 1/2009 | Wakefield et al. |
| 2009/0091536 A1 | 4/2009 | Callaghan |
| 2009/0128503 A1 | 5/2009 | Grant et al. |
| 2009/0160785 A1 | 6/2009 | Chen et al. |
| 2009/0167693 A1 | 7/2009 | Kuo et al. |
| 2009/0210568 A1 | 8/2009 | Peterson et al. |
| 2009/0314621 A1 | 12/2009 | Hotelling |
| 2009/0322725 A1 | 12/2009 | David et al. |
| 2010/0053087 A1 | 3/2010 | Dai et al. |
| 2010/0059294 A1 | 3/2010 | Elias et al. |
| 2010/0079309 A1 | 4/2010 | Filson et al. |
| 2010/0123676 A1 | 5/2010 | Kirkup |
| 2010/0134329 A1 | 6/2010 | Wang et al. |
| 2010/0141574 A1 | 6/2010 | Jung et al. |
| 2010/0148995 A1 | 6/2010 | Elias |
| 2010/0149099 A1 | 6/2010 | Elias |
| 2010/0149108 A1 | 6/2010 | Hotelling et al. |
| 2010/0164880 A1 | 7/2010 | Huang et al. |
| 2010/0177057 A1 | 7/2010 | Flint et al. |
| 2010/0259482 A1 | 10/2010 | Ball |
| 2010/0271315 A1 | 10/2010 | Bathiche |
| 2010/0273534 A1 | 10/2010 | Ström |
| 2011/0001706 A1 | 1/2011 | Sanford et al. |
| 2011/0006991 A1 | 1/2011 | Elias |
| 2011/0050638 A1 | 3/2011 | Lee |
| 2011/0057899 A1 | 3/2011 | Sleeman et al. |
| 2011/0102345 A1 | 5/2011 | Kim et al. |
| 2011/0141052 A1 | 6/2011 | Bernstein et al. |
| 2011/0163971 A1 | 7/2011 | Wagner et al. |
| 2011/0167375 A1 | 7/2011 | Kocienda |
| 2011/0169765 A1 | 7/2011 | Aono |
| 2011/0193817 A1 | 8/2011 | Byun et al. |
| 2011/0210917 A1 | 9/2011 | Lafave et al. |
| 2011/0227834 A1 | 9/2011 | Yang et al. |
| 2011/0227854 A1 | 9/2011 | Koya |
| 2011/0233041 A1 | 9/2011 | Rajagopal et al. |
| 2011/0241997 A1 | 10/2011 | Yang |
| 2011/0267287 A1 | 11/2011 | Bartling et al. |
| 2012/0032979 A1 | 2/2012 | Blow et al. |
| 2012/0127078 A1 | 5/2012 | Vecera et al. |
| 2012/0256839 A1 | 10/2012 | Suggs |
| 2012/0299866 A1 | 11/2012 | Pao et al. |
| 2013/0063285 A1 | 3/2013 | Elias |
| 2013/0063286 A1 | 3/2013 | Elias et al. |
| 2013/0063356 A1 | 3/2013 | Martisauskas |
| 2013/0069883 A1 | 3/2013 | Oga |
| 2013/0141342 A1 | 6/2013 | Bokma et al. |
| 2014/0035856 A1 | 2/2014 | Bokma et al. |
| 2015/0091867 A1 | 4/2015 | Bokma et al. |
| 2016/0320906 A1 | 11/2016 | Bokma et al. |
| 2018/0095545 A1 | 4/2018 | Martisauskas |
| 2018/0162996 A1 | 6/2018 | Choi et al. |
| 2018/0173364 A1 | 6/2018 | Bokma et al. |
| 2019/0272060 A1 | 9/2019 | Bokma et al. |
| 2020/0064927 A1 | 2/2020 | Martisauskas |

FOREIGN PATENT DOCUMENTS

| | | |
|---|---|---|
| CN | 101324822 A | 12/2008 |
| CN | 201285539 Y | 8/2009 |
| CN | 101583923 A | 11/2009 |
| CN | 101673164 A | 3/2010 |
| CN | 101689853 A | 3/2010 |
| CN | 101825966 A | 9/2010 |
| EP | 1653338 A1 | 5/2006 |
| GB | 2383194 A | 6/2003 |
| JP | 2000-163031 A | 6/2000 |
| JP | 2002-342033 A | 11/2002 |
| JP | 2010-152671 A | 7/2010 |
| JP | 2011-521374 A | 7/2011 |
| KR | 10-0617821 B1 | 8/2006 |
| KR | 10-2008-0023871 A | 3/2008 |
| KR | 10-2009-0002648 A | 1/2009 |
| TW | 201135568 A | 10/2011 |
| TW | 201142685 A | 12/2011 |
| WO | 2011/008861 A2 | 1/2011 |

(56) References Cited

FOREIGN PATENT DOCUMENTS

| WO | 2011/018439 A1 | 2/2011 |
| WO | 2013/039698 A1 | 3/2013 |
| WO | 2013/085580 A1 | 6/2013 |

OTHER PUBLICATIONS

Non-Final Office Action received for U.S. Appl. No. 16/670,810, dated Dec. 21, 2020, 36 pages.
Examiner's Answer to Appeal Brief received for U.S. Appl. No. 12/333,793, dated Feb. 24, 2016, 9 pages.
Final Office Action received for U.S. Appl. No. 12/333,793, dated Apr. 24, 2018, 22 pages.
Final Office Action received for U.S. Appl. No. 12/333,793, dated Mar. 9, 2012, 21 pages.
Final Office Action received for U.S. Appl. No. 12/333,793, dated May 30, 2019, 21 pages.
Final Office Action received for U.S. Appl. No. 12/333,793, dated Nov. 3, 2014, 24 pages.
Final Office Action received for U.S. Appl. No. 12/333,793, dated Sep. 17, 2013, 20 pages.
Final Office Action received for U.S. Appl. No. 12/334,320, dated Apr. 13, 2017, 41 pages.
Final Office Action received for U.S. Appl. No. 12/334,320, dated Oct. 16, 2012, 32 pages.
Final Office Action received for U.S. Appl. No. 13/232,941, dated Feb. 12, 2015, 23 pages.
Final Office Action received for U.S. Appl. No. 13/232,968, dated Oct. 2, 2014, 26 pages.
Final Office Action received for U.S. Appl. No. 13/232,968, dated Sep. 26, 2013, 21 pages.
Final Office Action received for U.S. Appl. No. 14/050,103, dated Jun. 4, 2014, 11 pages.
International Search Report received for PCT Patent Application No. PCT/US2012/052929, dated Dec. 5, 2012, 4 pages.
International Search Report received for PCT Patent Application No. PCT/US2012/052931, dated Feb. 5, 2013, 6 pages.
International Search Report received for PCT Patent Application No. PCT/US2012/053109, dated Dec. 19, 2012, 3 pages.
Non-Final Office Action received for U.S. Appl. No. 12/333,793, dated Apr. 15, 2013, 20 pages.
Non-Final Office Action received for U.S. Appl. No. 12/333,793, dated Aug. 10, 2017, 23 pages.
Non-Final Office Action received for U.S. Appl. No. 12/333,793, dated May 22, 2014, 24 pages.
Non-Final Office Action received for U.S. Appl. No. 12/333,793, dated Oct. 6, 2011, 17 pages.
Non-Final Office Action received for U.S. Appl. No. 12/333,793, dated Sep. 7, 2018, 22 pages.
Non-Final Office Action received for U.S. Appl. No. 12/334,320, dated Apr. 27, 2012, 26 pages.
Non-Final Office Action received for U.S. Appl. No. 12/334,320, dated Aug. 14, 2013, 38 pages.
Non-Final Office Action received for U.S. Appl. No. 12/334,320, dated Sep. 2, 2016, 39 pages.
Non-Final Office Action received for U.S. Appl. No. 13/232,941, dated Feb. 25, 2016, 17 pages.
Non-Final Office Action received for U.S. Appl. No. 13/232,941, dated Sep. 5, 2014, 14 pages.
Non-Final Office Action received for U.S. Appl. No. 13/232,941, dated Sep. 25, 2015, 14 pages.
Non-Final Office Action received for U.S. Appl. No. 13/232,955, dated Aug. 12, 2014, 8 pages.
Non-Final Office Action received for U.S. Appl. No. 13/232,968, dated Mar. 10, 2014, 25 pages.
Non-Final Office Action received for U.S. Appl. No. 13/232,968, dated May 9, 2013, 22 pages.
Non-Final Office Action received for U.S. Appl. No. 14/050,103, dated Dec. 13, 2013, 8 pages.
Non-Final Office Action received for U.S. Appl. No. 14/564,735, dated Sep. 25, 2015, 16 pages.
Non-Final Office Action received for U.S. Appl. No. 15/207,234, dated Apr. 24, 2017, 10 pages.
Non-Final Office Action received for U.S. Appl. No. 15/207,234, dated Aug. 25, 2016, 22 pages.
Non-Final Office Action received for U.S. Appl. No. 15/727,281, dated Oct. 16, 2018, 14 pages.
Non-Final Office Action received for U.S. Appl. No. 15/898,093, dated Jun. 14, 2018, 17 pages.
Notice of Allowance received for U.S. Appl. No. 12/333,793, dated Oct. 31, 2019, 12 pages.
Notice of Allowance received for U.S. Appl. No. 13/232,941, dated May 20, 2016, 7 pages.
Notice of Allowance received for U.S. Appl. No. 13/232,955, dated Jan. 23, 2015, 6 pages
Notice of Allowance received for U.S. Appl. No. 13/232,968, dated Jun. 7, 2017, 8 pages.
Notice of Allowance received for U.S. Appl. No. 13/312,803, dated Jul. 18, 2013, 9 pages.
Notice of Allowance received for U.S. Appl. No. 14/050,103, dated Sep. 10, 2014, 7 pages.
Notice of Allowance received for U.S. Appl. No. 14/564,735, dated Mar. 28, 2016, 5 pages.
Notice of Allowance received for U.S. Appl. No. 15/207,234, dated Oct. 25, 2017, 7 pages.
Notice of Allowance received for U.S. Appl. No. 15/898,093, dated Jan. 17, 2019, 5 pages.
Search Report received for Chinese Patent Application No. 201280057957.9, dated Mar. 8, 2016, 4 pages.
Search Report received for European Patent Application No. 17201576.0, dated Dec. 8, 2017, 4 pages.
Search Report received for Taiwanese Patent Application No. 101134042, dated Oct. 29, 2013, 1 page.
Fingerworks, "TouchStream LP", User Interface Descriptions, Available Online at: <http://fingerworks.com/ST_product.html>, Accessed on Nov. 13, 2008, 14 pages.
Lee et al., "A Multi-Touch Three Dimensional Touch-Sensitive Tablet", CHI'85 Proceedings, Apr. 1985, pp. 21-25.
Pash A., "Hack Attack: Operate Your Mouse with Your Keyboard", Lifehacker, Available online at: <http://lifehacker.com/software/mouser/hack-attack-operate-your-own-mouse-with-your-keyboard-212816.php>, Accessed on Nov. 7, 2006, 4 pages.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Examiner's Answer to Appeal Brief received for U.S. Appl. No. 12/334,320, dated Mar. 13, 2014, 40 pages.
Examiner's Answer to Appeal Brief received for U.S. Appl. No. 13/232,968, dated Sep. 10, 2015, 6 pages.
Notice of Allowance received for U.S. Appl. No. 14/564,735, dated May 16, 2016, 2 pages.
Notice of Allowance received for U.S. Appl. No. 15/207,234, dated Jan. 23, 2018, 2 pages.
Notice of Allowance received for U.S. Appl. No. 15/727,281, dated Jun. 19, 2019, 8 pages.

\* cited by examiner

TOUCH SENSITIVE MECHANICAL KEYBOARD

CROSS-REFERENCE TO RELATED APPLICATION

This application is a continuation of U.S. application Ser. No. 12/333,793 filed Dec. 12, 2008 and published on Jun. 17, 2010 as U.S. Publication No. 2010/0148995, the content of which is incorporated herein by reference in its entirety for all purposes.

FIELD OF THE INVENTION

This invention generally relates to input devices for computing systems, and more particularly, to improving the user interface experience associated with key-based input devices.

BACKGROUND OF THE INVENTION

A computer keyboard is a peripheral modeled after the typewriter keyboard. Keyboards are used to provide textual input into the computer and to control the operation of the computer. Physically, computer keyboards are generally an arrangement of rectangular or near-rectangular buttons or "keys," which typically have engraved or printed characters. In most cases, each depressing of a key corresponds to a single character. However, some characters require that a user depress and hold several keys concurrently or in sequence. Depressing and holding several keys concurrently or in sequence can also result in a command being issued that affects the operation of the computer, or the keyboard itself.

There are several types of keyboards, usually differentiated by the switch technology employed in their operation. The choice of switch technology can affect the keys' response (i.e., the positive feedback that a key has been depressed) and travel (i.e., the distance needed to push the key to enter a character reliably). One of the most common keyboard types is a "dome-switch" keyboard which works as follows. When a key is depressed, the key pushes down on a rubber dome sitting beneath the key. The rubber dome collapses, which gives tactile feedback to the user depressing the key, and causes a conductive contact on the underside of the dome to touch a pair of conductive lines on a Printed Circuit Board (PCB) below the dome, thereby closing the switch. A chip in the keyboard emits a scanning signal along the pairs of lines on the PCB to all the keys. When the signal in one pair of the lines changes due to the contact, the chip generates a code corresponding to the key connected to that pair of lines. This code is sent to the computer either through a keyboard cable or over a wireless connection, where it is received and decoded into the appropriate key. The computer then decides what to do on the basis of the key depressed, such as display a character on the screen or perform some action. Other types of keyboards operate in a similar manner, with the main differences being how the individual key switches work. Some examples of other keyboards include capacitive-switch keyboards, mechanical-switch keyboards, Hall-effect keyboards, membrane keyboards, roll-up keyboards, and so on.

Conventional mechanical keyboards are generally accepted as the preferred means to provide textual input. These keyboards have mechanical keys that are configured to move independently of one another and comply with standards for key spacing and actuation force. These keyboards are also arranged in the so-called QWERTY layout. Over the last forty years there have been numerous attempts made to introduce an alternative to the standard keyboard. The changes include, but are not limited to, non-QWERTY layouts, concave and convex surfaces, capacitive keys, split designs, membrane keys, etc. However, although such alternative keyboards may provide improved usability or ergonomics, they have failed to replace or duplicate the commercial success of the conventional mechanical keyboard.

SUMMARY OF THE INVENTION

A touch sensitive mechanical keyboard is disclosed. The touch sensitive mechanical keyboard improves the user interface experience associated with key-based input devices.

The touch sensitive mechanical keyboard enables a standard look and feel mechanical keyboard to sense fine hand/finger motion over the surface of the keys such that command and cursor input (e.g., pointing and gestures) can be received from the user without requiring the user to move the user's hand off the keyboard.

Fine hand/finger motion detection can be enabled by embedding clusters of capacitive sensors near the surface of the keyboard's keys. The touch sensitive mechanical keyboard can operate in two or more modes—e.g., a typing mode and a mouse mode—and operating the keyboard in mouse mode or switching between the modes can be facilitated by holding (depressing and holding) or tapping (depressing and releasing) arbitrary combinations of keys, or by detecting the number of fingers touching the touch sensitive mechanical keyboard.

DETAILED DESCRIPTION OF THE PREFERRED EMBODIMENTS

In the following description of preferred embodiments, reference is made to the accompanying drawings where it is shown by way of illustration specific embodiments in which the invention can be practiced. It is to be understood that other embodiments can be used and structural changes can be made without departing from the scope of the embodiments of this invention.

Embodiments of the invention relate to enabling a standard look and feel mechanical keyboard to sense fine hand/finger motion over the surface of the keys such that command and cursor input (e.g., pointing and gestures) can be received from the user without requiring the user to move the user's hand off the keyboard. Fine hand/finger motion detection can be enabled by embedding clusters of capacitive sensors near the surface of the keyboard's keys. The touch sensitive mechanical keyboard can operate in two or more modes—e.g., a typing mode and a mouse mode—and operating the keyboard in mouse mode or switching between the modes can be facilitated by holding (depressing and holding) or tapping (depressing and releasing) arbitrary combinations of keys, or by detecting the number of fingers touching the touch sensitive mechanical keyboard.

Although some embodiments of this invention may be described and illustrated herein in terms of an input device associated with a standalone computer keyboard, it should be understood that embodiments of this invention are not so limited, but are generally applicable to touch sensitive mechanical keys associated with any device or structure, such as automated teller machines (ATMs), kiosks/information booths, key pads, automated check-in terminals at airports, automated check-out machines at retail stores, etc.

Figure 1:
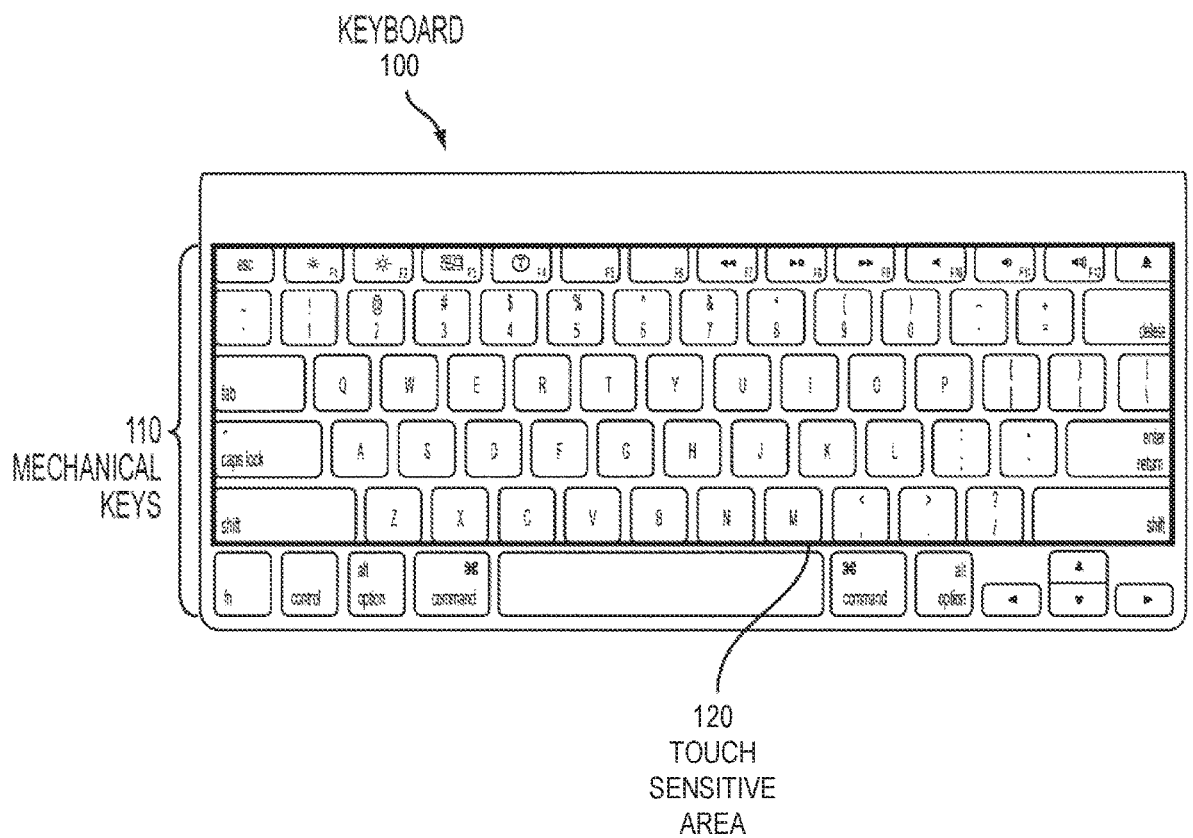
FIG. 1 illustrates an exemplary touch sensitive mechanical keyboard according to one embodiment of the invention.

FIG. 1 illustrates touch sensitive mechanical keyboard 100 having mechanical keys 110 and touch sensitive area 120 spanning all of keys 110 except for the bottom-most row. In other embodiments, touch sensitive area 120 can span all keys 110 or any region of keys 110 on keyboard 100. To maximize the likelihood of acceptance with the general population, keyboard 100 has the look and feel of a conventional keyboard. By integrating multi-touch input capability into keyboard 100 without altering its overall appearance or, more importantly, the familiar way in which it is used for typing, most of the benefits of a multi-touch gesture-based input capability can be realized without having any negative impact on the user's text entry experience. Cursor input functions, such as point, click, scroll, drag, select and zoom for example, can be enabled with keyboard 100 such that the user can invoke any one of these functions without moving the user's hands off keyboard 100. These functions, and more, can be driven by hand/finger motion while the fingers are sliding over and touching keys 110 of keyboard 100.

Keyboard 100 can operate in two or more distinct modes in one embodiment: e.g., a typing mode and a mouse mode. While in typing mode, the normal movement of objects such as hands and fingers can be ignored by the touch sensing circuitry. This ensures that nothing unexpected happens like the cursor moving, the page scrolling, or the screen zooming as the user moves the user's fingers across the keys while typing. In typing mode, keyboard 100 operates as normal, accepting single key taps as text or number inputs, for example. Modifier key, hot key, and function key input also operate as normal in typing mode. In other words, keyboard 100 functions and feels just like one would expect a conventional mechanical keyboard to function and feel when in typing mode.

In mouse mode, typing, for the most part, can be disabled. In mouse mode, touch sensing circuitry associated with keyboard 100 can track the movement of the user's hands/fingers in order to provide cursor input, such as moving the cursor, scrolling, dragging or zooming, for example, with a one-to-one correlation between hand/finger motion and the desired action of moving something on the screen. Either hand can be used to guide the motion of the on-screen action. As a result, left-handed users can provide cursor input just as easily as right-handed users can.

In typing mode, the keys can be tapped one at a time (except when modifier keys are used, for example) and the hand/finger motion accompanying the typing execution can be ignored by the touch sensing circuitry.

Separating the function of keyboard 100 into two or more distinct modes that the user deliberately invokes has the advantage of eliminating the chance that random or postural changes in hand/finger position can be misinterpreted as a cursor input (e.g., point, scroll, drag, zoom). In this manner, keyboard 100 does not need to determine when the user intends to issue commands to control screen activities (e.g., scrolling) because the user informs keyboard 100 of the user's intent by switching modes. Mode switching can be implemented in various ways. In some embodiments, mode switching can be implemented in ways that do not require the user to look down at keyboard 100, thereby improving the user experience. In one embodiment, a dedicated "mouse" key can be provided such that mouse mode is entered for the duration that the mouse key is held down. In another embodiment, the dedicated mouse key can comprise a "sticky" key, such that a tap of the key switches between modes. In a further embodiment, the modes can be switched when the user concurrently taps an arbitrary combination of the keys. For example, in one embodiment, the arbitrary combination of the keys can include any four of keys 110. In another embodiment, the arbitrary combination of the keys can be restricted to adjacent keys in order to effect the mode switch.

Figure 2:
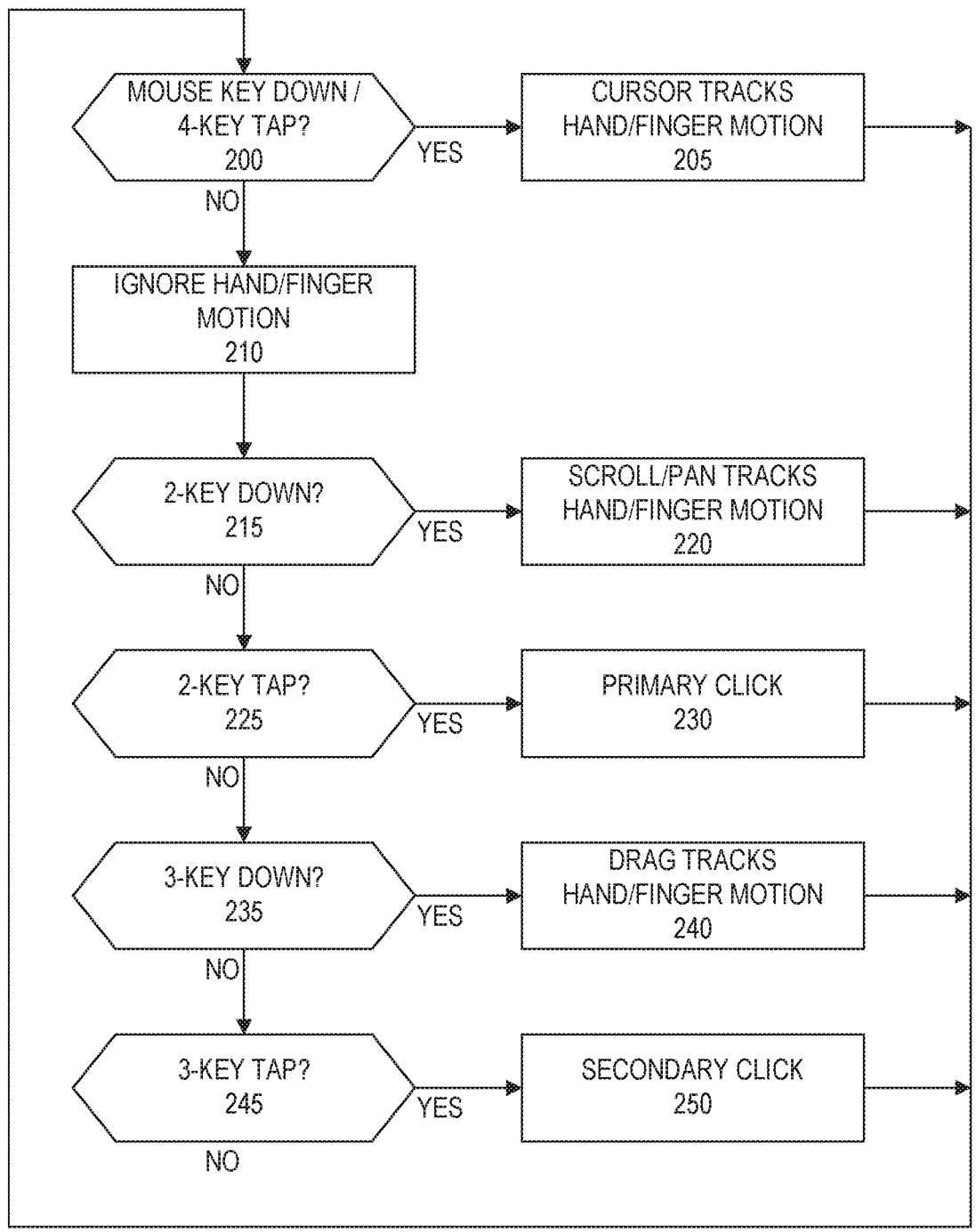
FIG. 2 illustrates an exemplary process for providing cursor input with a touch sensitive mechanical keyboard according to one embodiment of the invention.

FIG. 2 illustrates a process for switching between typing and mouse operations using keyboard 100. In mouse mode in the illustrated embodiment, the hand that is not being used for pointing or gesturing can hold down a number of adjacent keys (e.g., 2, 3, or 4) while the other hand/fingers move about the keyboard surface and are tracked by the touch sensing circuitry. For example, while a dedicated mouse key is held down or if a 4-key tap occurs (block 200), keyboard 100 can enter mouse mode such that touch sensing circuitry tracks hand/finger motion (block 205). If not, keyboard 100 can remain in typing mode and hand/finger motion can be ignored (block 210). While two keys are held down (block 215), touch sensing circuitry can track hand/finger motion to effect a scroll (for detected horizontal motion) and pan (for detected vertical motion) (block 220). Keyboard 100 can also interpret a two-key tap (block 225) as a primary click (similar to a left click on a conventional mouse) (block 230). While three keys are held down (block 235), the touch sensing circuitry can track hand/finger motion to effect a drag operation (similar to a click-hold and drag operation by a conventional mouse) (block 240). Keyboard 100 can also interpret a three-key tap (block 245) as a secondary click (similar to a right click on a conventional mouse) (block 250).

It is noted that any suitable mouse operation may be associated with any particular multi-key tap. It is also noted that any suitable number of keys may be utilized in the key tap and hold down operations described in the embodiments illustrated in FIG. 2. The keys may be dedicated (i.e., the same keys can be required to effect the designated operation) or arbitrary (i.e., any of the specified number of keys on keyboard 100—or in any region of keyboard 100—can effect the designated operation). In another embodiment, keyboard 100 can allow non-adjacent keys to effect the described key tap and hold down operations. It is also noted that a user need not explicitly enter mouse mode prior to effecting the operations described in blocks 220, 230, 240 and 250.

Figure 3A:
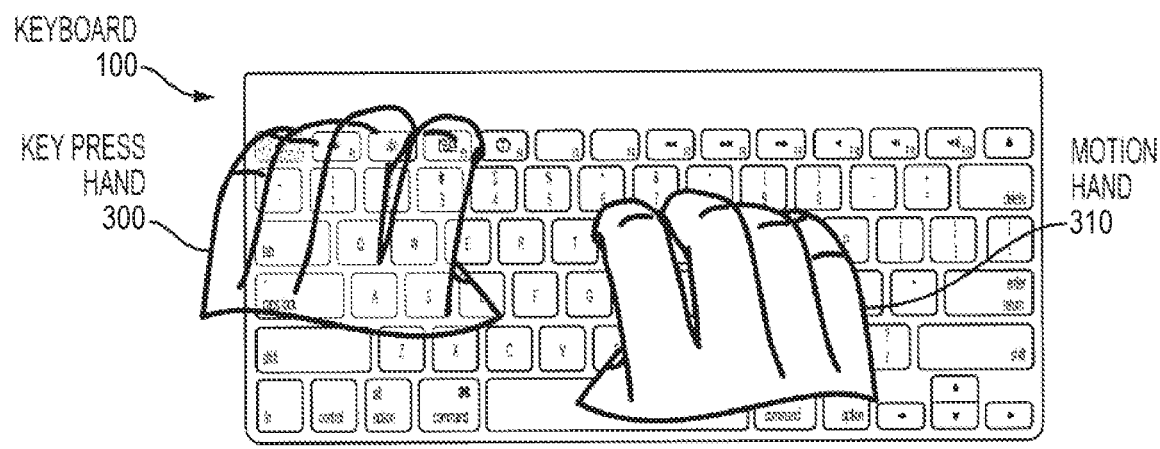
FIGS. 3A-3C illustrate exemplary hand controls for operating a touch sensitive mechanical keyboard according to embodiments of the invention.
Figure 3B:
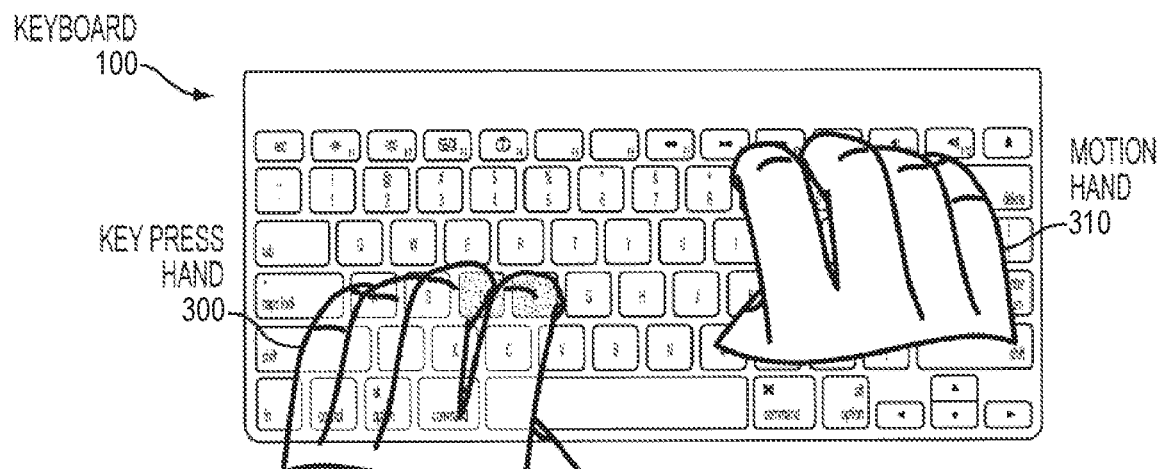
Figure 3C:
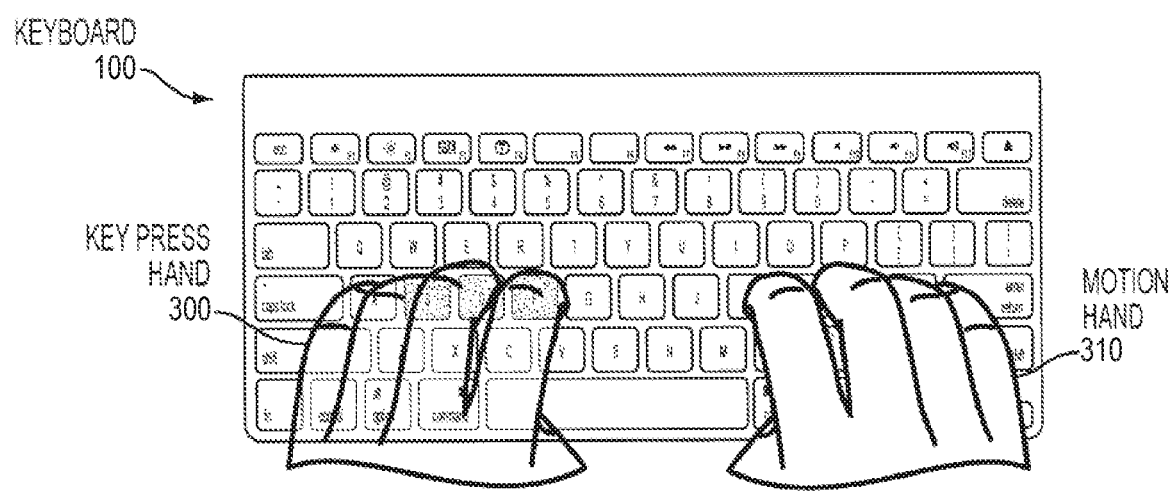

FIGS. 3A-3C illustrate examples of pointing (FIG. 3A), scrolling/panning (FIG. 3B), and dragging (FIG. 3C) according the embodiments of the present invention. In FIG. 3A, key press hand 300 can hold down a mouse-key while the hand/finger movement of motion hand 310 can be tracked by the touch sensing circuitry, which can cause the cursor to follow the hand/finger movement. In FIG. 3B, key press hand 300 can hold down two adjacent keys while the hand/finger movement of motion hand 310 can be tracked by the touch sensing circuitry. Up and down movement can control scroll while left and right movement can control pan. In FIG. 3C, key press hand 300 hand can hold down three adjacent keys while the hand/finger movement of motion hand 310 can be tracked by the touch sensing circuitry. The hand/finger movement can control the drag function.

As described above in connection with selection operations, tapping two adjacent keys can produce a primary mouse click, while tapping three adjacent keys can produce a secondary mouse click. To illustrate how this works, presume the user enters mouse mode by holding down the mouse-key with the user's left pinky finger. The cursor can then follow the movement of the user's right hand and fingers. When the user has moved the cursor to the intended target and is ready to click on it, the user can release the mouse key. This can stop the touch sensing circuitry from tracking the user's hand/finger motion. The user can tap two adjacent keys to enter a primary mouse click. Either hand can be used to tap the two keys, and, if desired, the user does not have to release the mouse key to invoke a mouse click. Not releasing the mouse key may introduce some risk that the cursor could move before the two keys are tapped, but some users may be able to do so without a problem. The whole operation of pointing, releasing the mouse key, and tapping two adjacent keys is smooth, fast, and easy to coordinate.

Figure 4:
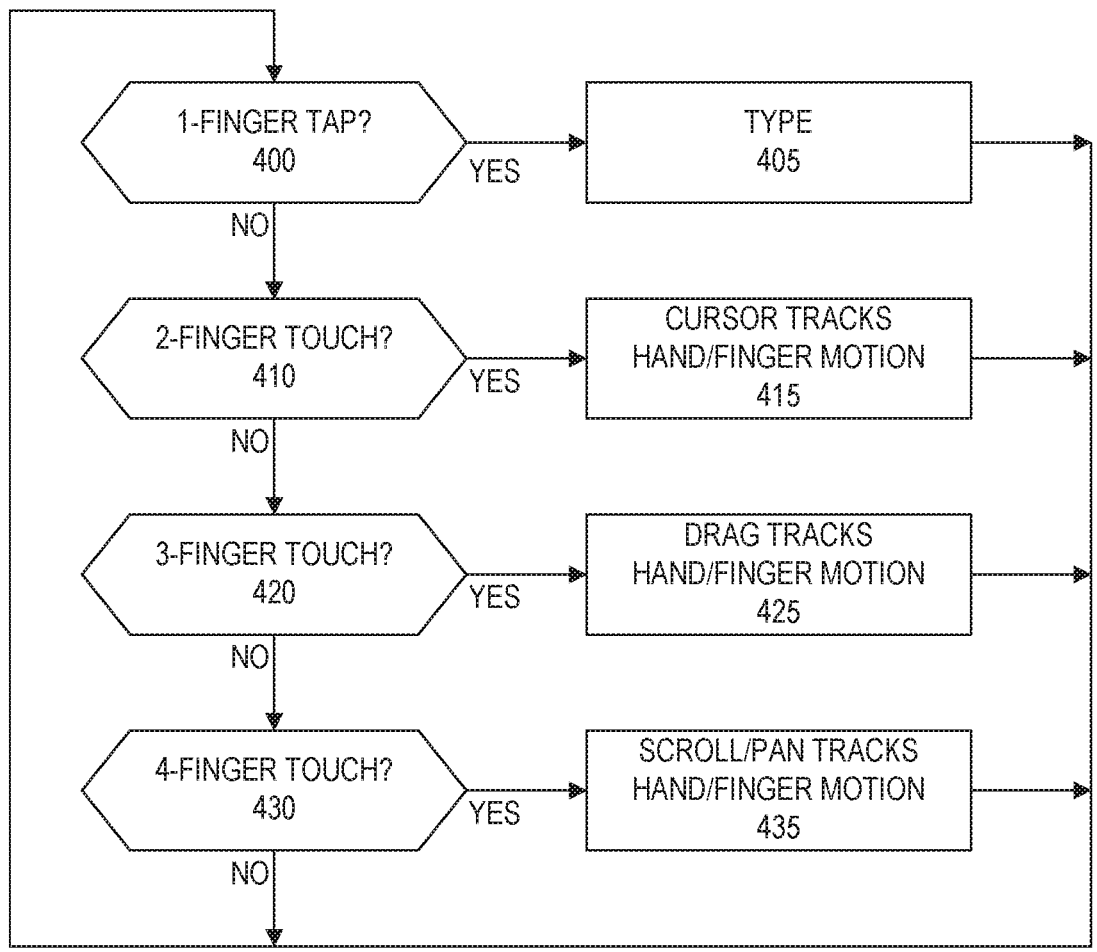
FIG. 4 illustrates an exemplary process for providing cursor input with a touch sensitive mechanical keyboard according to one embodiment of the invention.

FIG. 4 illustrates a process for seamless switching between typing and mouse operations using keyboard 100. In this embodiment, mode switching can be implemented seamlessly by keyboard 100 by monitoring the number of fingers touching down on its surface, and using that number to signal which mode is active. In particular, when a single-finger tap (block 400) is detected, keyboard 100 can invoke typing mode (block 405). When a two-finger touch (block 410) is detected, keyboard 100 can enter mouse mode such that touch sensing circuitry tracks hand/finger motion (block 415). When a three-finger touch (block 420) is detected, keyboard 100 can enter mouse mode such that the touch sensing circuitry can track hand/finger motion to effect a drag operation (similar to a click-hold and drag operation by a conventional mouse) (block 425). When a four-finger touch (block 430) is detected, keyboard 100 can enter mouse mode such that the touch sensing circuitry can track hand/finger motion to effect a scroll (for detected horizontal motion) and pan (for detected vertical motion) (block 435).

It is noted that any suitable mouse operation may be associated with any particular multi-finger touch. Further, other functions can be supported in connection with the above-described embodiments in addition to the commonly used cursor input functions of point, scroll, drag, and zoom. For example, hand rotation and hand expansion/contraction gestures can be used for zooming and/or opening and closing files; hand swipes and slides can be used to accelerate operations like text cursor positioning; and two-hand motion monitoring can be used by employing a sticky mouse-key, which enables both hands to provide cursor input motion in mouse mode, or by using the seamless mode switch capability described above.

Figure 5:
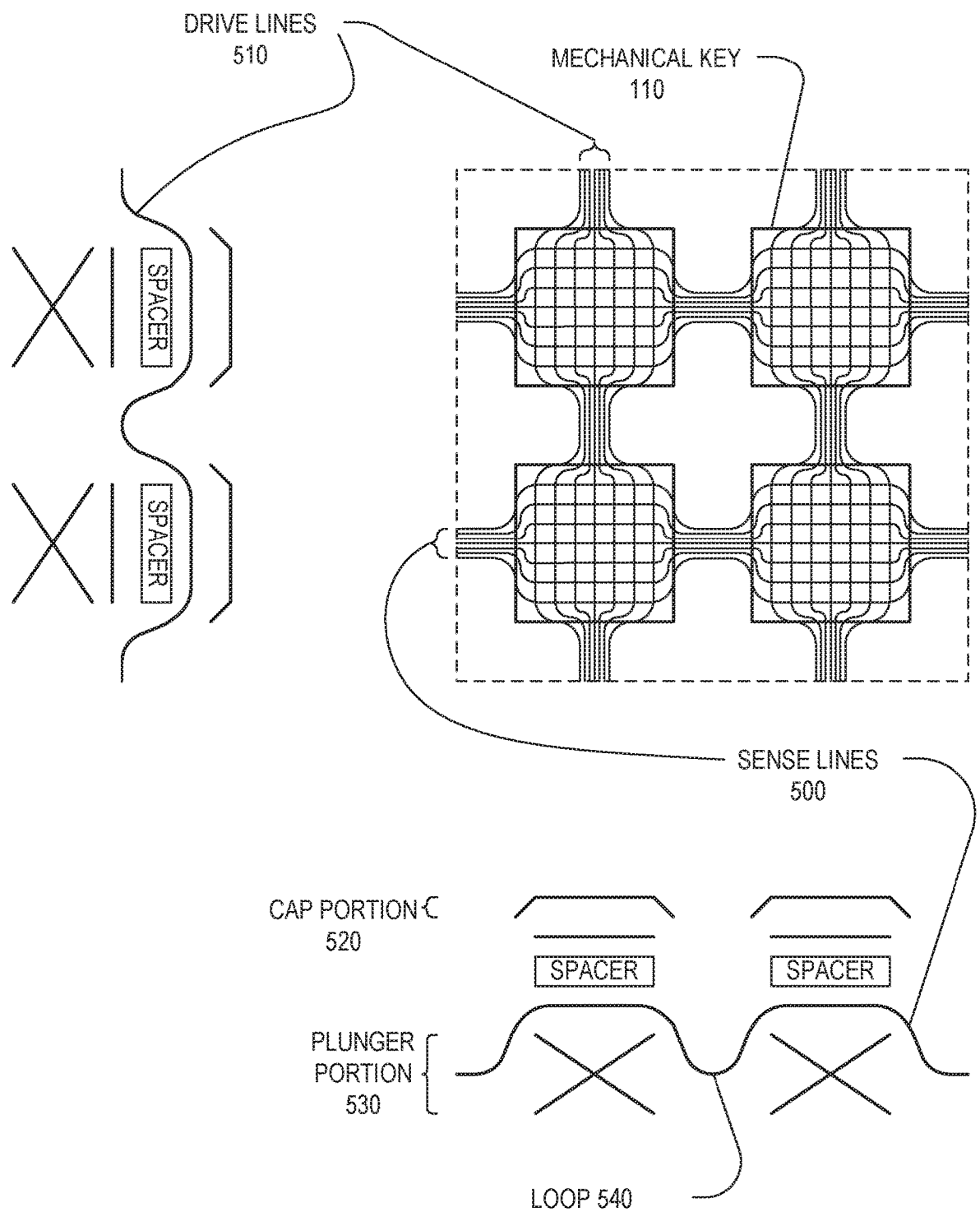
FIG. 5 illustrates an exemplary touch sensitive keyboard configuration according to an embodiment of the invention.

Touch sensing associated with keyboard 100 can be implemented via capacitive sensing using a high-resolution near-field sensor array capable of tracking individual contacts made by each finger tip and hand part touching keys 110. An exemplary touch sensitive keyboard configuration is illustrated in FIG. 5. In this embodiment, clusters of intersecting drive lines 510 and sense lines 500 can form electrodes to act as sensor nodes, which can be embedded near the surface of the keys 110.

Multi-touch touch-sensitive panels according to one embodiment of this invention can detect multiple touches (touch events or contact points) that occur at about the same time (and at different times), and identify and track their locations. Touch sensor panels are disclosed, for example, in U.S. application Ser. No. 11/482,286, filed Jul. 6, 2006 and entitled "Mutual Capacitance Touch Sensing Device," and U.S. application Ser. No. 11/649,998, filed Jan. 3, 2007 and entitled "Proximity and Multi-Touch Sensor Detection and Demodulation," the contents of which are incorporated herein by reference in their entirety for all purposes.

In particular, each cluster of sensor nodes can be embedded between cap portion 520 and plunger portion 530 of keys 110 in order to be positioned closely enough to an object touching or in proximity to keys 110 for suitable detection. Dielectric spacers can be disposed between the electrodes of each sensor node to provide a suitable dynamic range of capacitive sensing. In one embodiment, the electrodes associated with each sensor node can be formed on separate membranes, such as flexible PCBs, and combined together prior to integration into keyboard 100. In another embodiment, the electrodes associated with each sensor node can be formed on opposite sides of a single membrane, whose thickness can act as a dielectric spacer and be optimized for suitable capacitive sensing. In yet another embodiment, the electrodes associated with each sensor node can be formed on the same side of a single membrane.

Figure 6:
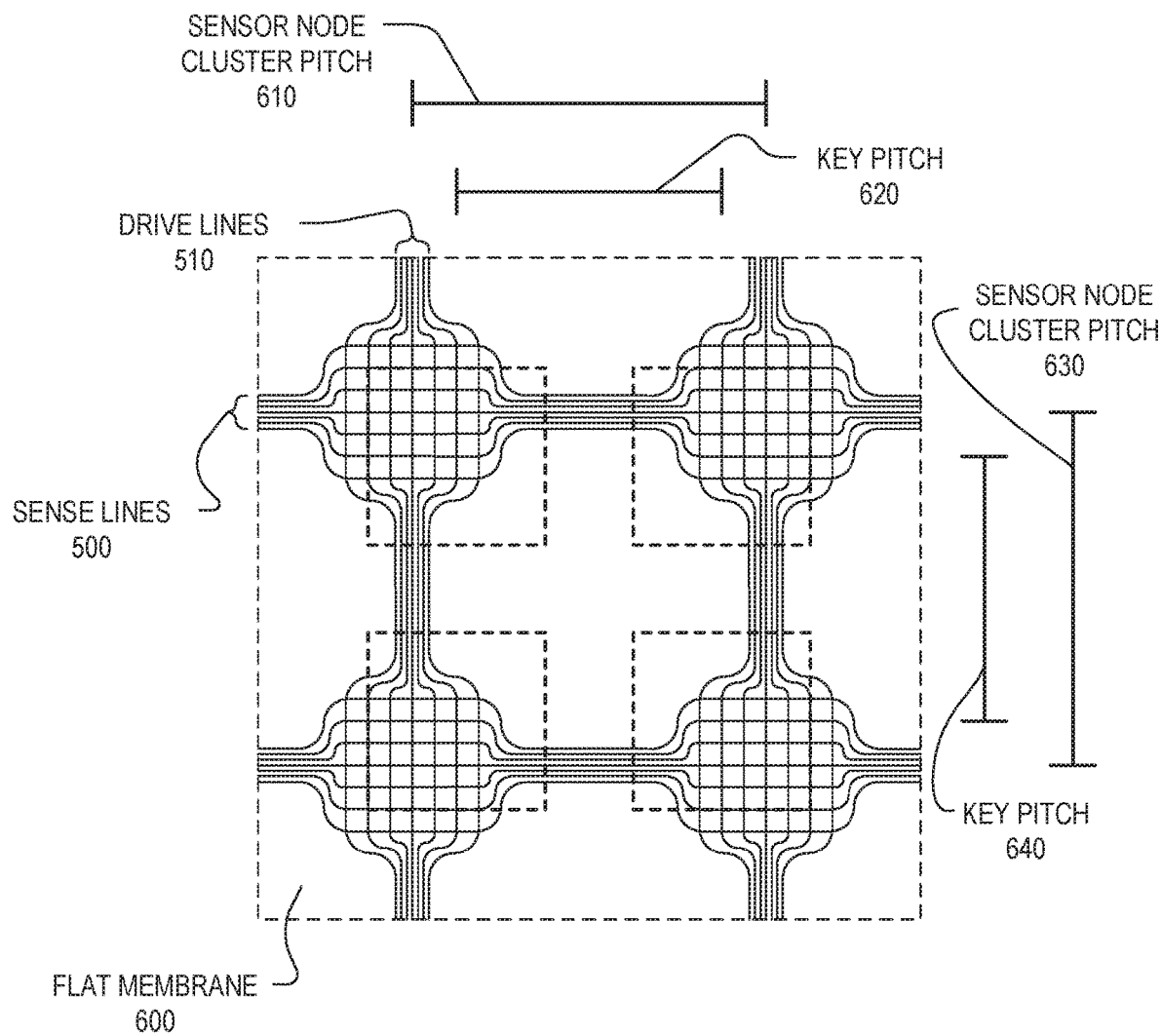
FIG. 6 illustrates an exemplary touch sensitive keyboard membrane according to an embodiment of the invention.

FIG. 6 illustrates exemplary touch sensitive keyboard membrane 600 that can be embedded into keyboard 100. In order to provide for unimpeded depression of keys 110, the clusters of sensor nodes can be formed at pitch greater than that of keys 110. For instance, the row clusters of sensor nodes on membrane 600 can be formed at pitch 610 greater than pitch 620 of keys 110 in the x direction. And the column clusters of sensor nodes on membrane 600 can be formed at pitch 630 greater than pitch 640 of keys 110 in the y direction. In this manner, when membrane 600 is embedded into keyboard 100, loops 540 (as shown in FIG. 5) can form, enabling slack to compensate for independent depression of keys 110.

In order to enable loops 540 to form, portions of the membranes between drive lines 510 and sense lines 500 can be removed during suitable stages of manufacture. For example, in an embodiment in which drive lines 510 and sense lines 500 are formed on separate membranes and combined, the portions of each membrane between either drive lines 510 or sense lines 500 can be removed either after forming the lines and prior to combining the membranes, or the portions can be removed after the membranes are combined. The portions may be removed by die cutting, for example.

The sensor nodes within each cluster can also be configured to have different sensing resolution to compensate for the spacing between keys 110. For example, a sensor node closer to an edge of one key can be configured to have a greater sensing resolution than a sensor node closer to the middle of the key. In one embodiment, the different sensing resolution can result from a difference in spacing between electrodes of the sensor nodes associated with the key. In another embodiment, the different sensing resolution can result from a difference in an amount of conductive material forming the sensor nodes.

Figure 7:
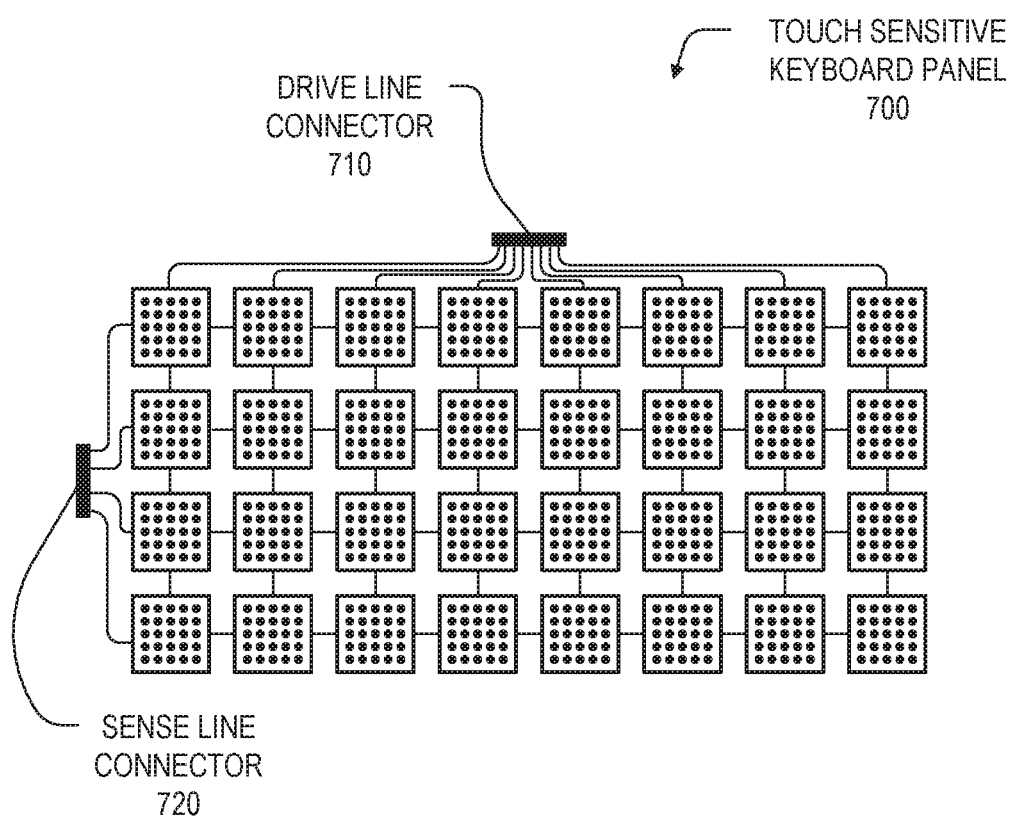
FIG. 7 illustrates an exemplary touch sensitive keyboard panel according to an embodiment of the invention.

When integrated into keyboard 100, drive lines 510 and sense lines 500 can converge to respective connectors associated with the drive circuitry and sense circuitry on either the same or different sides of the touch sensitive keyboard panel. In one embodiment, as illustrated in FIG. 7, the drive and sense lines can exit the touch sensitive keyboard panel on orthogonal edges. In particular, in touch sensitive keyboard panel 700, the drive lines converge to drive line connector 710, and the sense lines converge to sense line connector 720. In another embodiment (not shown), the drive and sense lines can be routed to exit on the same edge of the touch sensitive keyboard panel.

Figure 8:
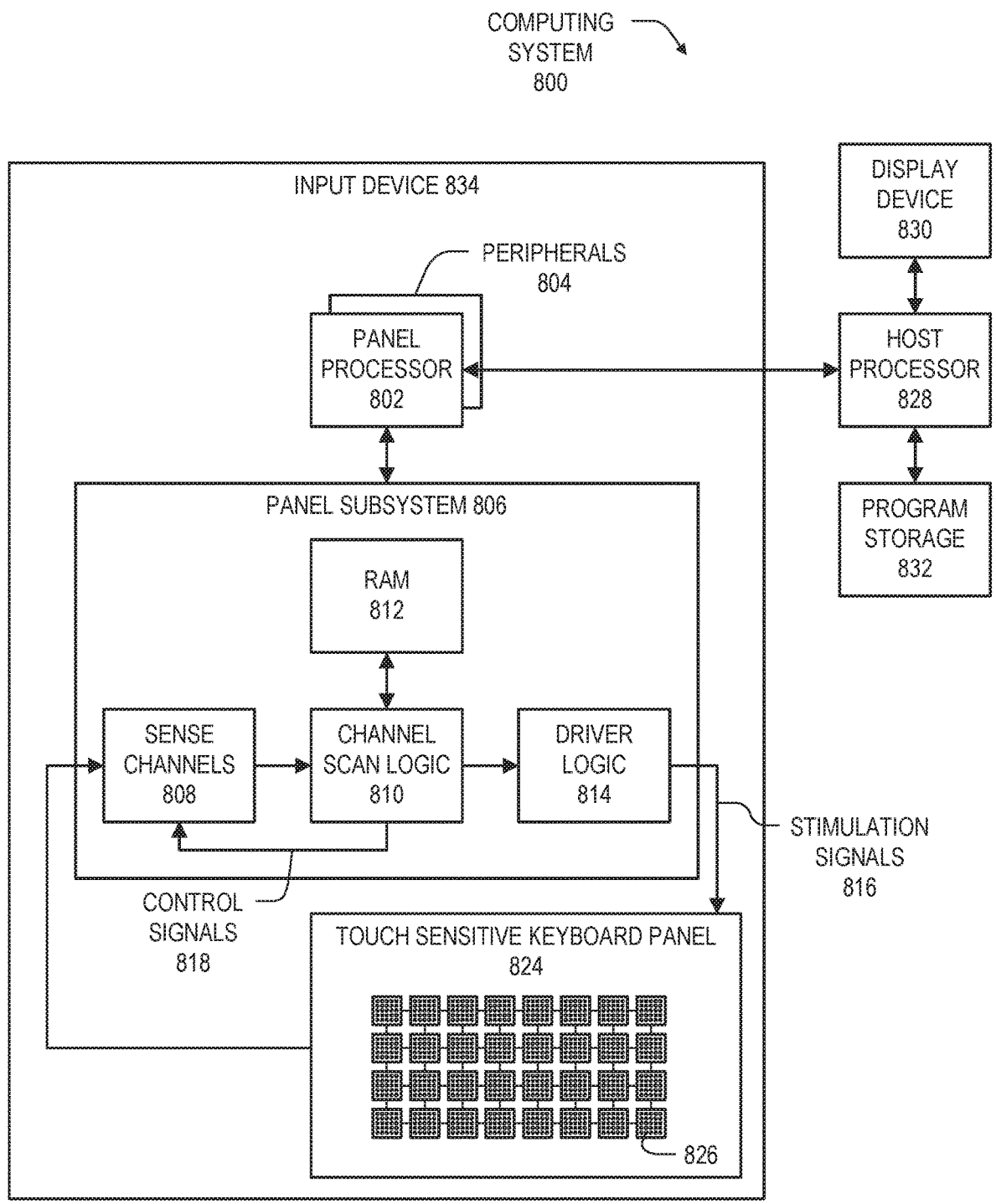
FIG. 8 illustrates an exemplary computing system including an input device according to embodiments of the invention.

FIG. 8 illustrates exemplary computing system 800 that can implement embodiments of the invention as described above. Computing system 800 can include input device 834, which can correspond to a touch sensitive mechanical keyboard such as keyboard 100 described above, and can include one or more panel processors 802, peripherals 804 and panel subsystem 806. Peripherals 804 can include, but are not limited to, random access memory (RAM) or other types of memory or storage, watchdog timers and the like. Panel subsystem 806 can include, but is not limited to, one or more sense channels 808, channel scan logic 810 and driver logic 814. Channel scan logic 810 can access RAM 812, autonomously read data from the sense channels and provide control signals 818 for the sense channels. In addition, channel scan logic 810 can control driver logic 814 to generate stimulation signals 816 that can be selectively applied to drive lines of touch sensitive keyboard panel 824, which may correspond to touch sensitive keyboard panel 700 described above. In some embodiments, panel subsystem 806, panel processor 802 and peripherals 804 can be integrated into a single application specific integrated circuit (ASIC).

Touch sensitive keyboard panel 824 can be embedded within a mechanical keyboard and include a capacitive sensing medium having a plurality of drive lines and a plurality of sense lines, although other sensing configurations can also be used. Each intersection of drive and sense lines can represent a sensor node and can be viewed as picture element (pixel) 826, which can be particularly useful when touch sensitive keyboard panel 824 is viewed as capturing an "image" of touch. (In other words, after panel subsystem 806 has determined whether a touch event has been detected at each touch sensor in the touch sensitive keyboard panel, the pattern of touch sensors in the keyboard panel at which a touch event occurred can be viewed as an "image" of touch (e.g. a pattern of fingers touching the panel). Each sense line of touch sensor panel 824 can drive sense channel 808 in panel subsystem 806.

Computing system 800 can also include display device 830 comprising a display such as an LCD, for example, and host processor 828 for receiving outputs from panel processor 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 828 can also perform additional functions that may not be related to panel processing, and can be coupled to program storage 832 and display device 830 for providing a UI to a user of the device.

Note that one or more of the functions described above can be performed by firmware stored in memory (e.g. one of the peripherals 804 in FIG. 8) and executed by panel processor 802, or stored in program storage 832 and executed by host processor 828. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 9A:
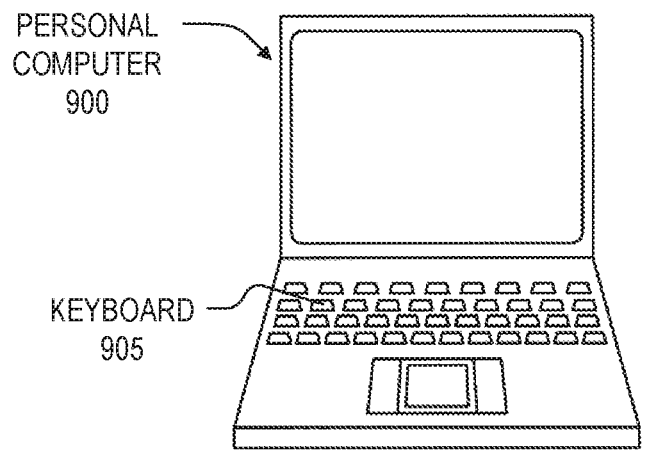
FIGS. 9A and 9B illustrate exemplary personal computers having a touch sensitive mechanical keyboard according to embodiments of the invention.
Figure 9B:
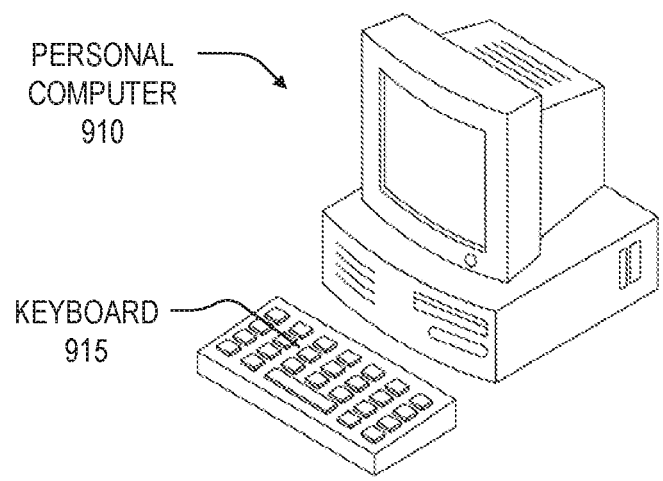

Computing system 800 can be any of a variety of types employing a touch sensitive mechanical keyboard, such as those illustrated in FIGS. 9A-9B, for example. FIGS. 9A and 9B illustrate exemplary personal computers 900 (in a laptop configuration) and 910 (in a desktop system configuration) that can include touch sensitive mechanical keyboards 905 and 915 according to embodiments of the invention. The personal computers of FIGS. 9A-9B can achieve an improved user interface by utilizing a touch sensitive mechanical keyboard according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch input system, comprising:
a touch sensitive keyboard including a plurality of keys,
each key of the plurality of keys having a touch surface including a plurality of sensor nodes, each sensor node of the plurality of sensor nodes configurable for detecting an object touching or in proximity to said each sensor node and generating one of a plurality of first signals, and
said each key of the plurality of keys configurable for detecting a depression of said each key and generating one of a plurality of second signals; and
a processor communicatively coupled to the touch sensitive keyboard, the processor configured for:
upon a detection of one or more key depressions on the touch sensitive keyboard:
causing the touch sensitive keyboard to switch between operating in a typing mode and operating in a mouse mode; and
when the one or more key depressions cause the touch sensitive keyboard to switch from the typing mode to the mouse mode, performing a respective mouse operation using the one or more key depressions, wherein:
in accordance with a determination that the one or more key depressions are held down when switching to the mouse mode, the respective mouse operation is performed in accordance with one or more objects that are touching or in proximity to the plurality of sensor nodes.

2. The touch input system of claim 1, the processor further configured for, after detecting that the one or more key depressions that caused the touch sensitive to switch from the typing mode to the mouse mode are no longer held down, causing the touch sensitive keyboard to switch from the mouse mode to the typing mode.

3. The touch input system of claim 1, wherein the determination that the one or more key depressions are held down when switching to the mouse mode further includes determining that the one or more key depressions include a holding down of an arbitrary combination of the plurality of keys on the touch sensitive keyboard.

4. The touch input system of claim 1, wherein the determination that the one or more key depressions are held down when switching to the mouse mode further includes determining that the one or more key depressions include a holding down of a predetermined number of the plurality of keys on the touch sensitive keyboard.

5. The touch input system of claim 4, wherein the predetermined number of the plurality of keys comprise adjacent keys on the touch sensitive keyboard.

6. The touch input system of claim 1, wherein the determination that the one or more key depressions are held down when switching to the mouse mode further includes determining that the one or more key depressions include a holding down of a dedicated key on the touch sensitive keyboard.

7. The touch input system of claim 1, wherein performing the respective mouse operation using the one or more key depressions further comprises:
in accordance with the determination that the one or more key depressions results in a tap when switching to the mouse mode, the respective mouse operation performed corresponds to the tap.

8. The touch input system of claim 7, the processor further configured for, after performing the respective mouse operation corresponding to the tap, causing the touch sensitive keyboard to switch from the mouse mode to the typing mode.

9. The touch input system of claim 7, wherein the determination that the one or more key depressions results in the tap when switching to the mouse mode further includes determining that the one or more key depressions include a tapping of an arbitrary combination of the plurality of keys on the touch sensitive keyboard.

10. The touch input system of claim 7, wherein the determination that the one or more key depressions results in the tap when switching to the mouse mode further includes determining that the one or more key depressions include a tapping of a predetermined number of the plurality of keys on the touch sensitive keyboard.

11. The touch input system of claim 10, wherein the predetermined number of the plurality of keys on the touch sensitive keyboard comprise adjacent keys on the touch sensitive keyboard.

12. The touch input system of claim 7, wherein the determination that the one or more key depressions results in the tap when switching to the mouse mode further includes determining that the one or more key depressions include a tapping of a dedicated key.

13. A method for operating a touch sensitive keyboard including a plurality of keys, comprising:
upon detecting one or more key depressions at the plurality of keys on the touch sensitive keyboard, causing the touch sensitive keyboard to switch between operating in a typing mode and operating in a mouse mode;
when the one or more key depressions cause the touch sensitive keyboard to switch from operating in the typing mode to operating in the mouse mode, performing a respective mouse operation using the one or more key depressions, wherein performing the respective mouse operation comprises:
in accordance with a determination that the one or more key depressions are held down when switching to the mouse mode, performing the respective mouse operation includes detecting an object touching or in proximity to one or more sensor nodes of a plurality of sensor nodes on a touch surface of each of one or more keys of the plurality of keys and generating one of a plurality of first signals; and
when operating in the typing mode, detecting a depression of said one or more keys of the plurality of keys and generating one of a plurality of second signals.

14. The method of claim 13, further comprising, after detecting that the one or more key depressions that caused the touch sensitive keyboard to switch from operating in the typing mode to operating in the mouse mode are no longer held down, causing the touch sensitive keyboard to switch from the mouse mode to the typing mode.

15. The method of claim 13, wherein the determination that the one or more key depressions are held down when switching to the mouse mode further includes determining that the one or more key depressions include a holding down of an arbitrary combination of the plurality of keys on the touch sensitive keyboard.

16. The method of claim 13, wherein the determination that the one or more key depressions are held down when switching to the mouse mode further includes determining that the one or more key depressions include detecting a holding down of a predetermined number of the plurality of keys on the touch sensitive keyboard.

17. The method of claim 16, wherein the predetermined number of the plurality of keys on the touch sensitive keyboard comprise adjacent keys on the touch sensitive keyboard.

18. The method of claim 13, wherein the determination that the one or more key depressions are held down when switching to the mouse mode further includes determining that the one or more key depressions include a holding down of a dedicated key on the touch sensitive keyboard.

19. The method of claim 13, wherein performing the respective mouse operation further includes:
   in accordance with the determination that the one or more key depressions results in a tap when switching to the mouse mode, performing the respective mouse operation corresponds to the tap.

20. The method of claim 19, further comprising after performing the respective mouse operation corresponding to the one or more key depressions that were tapped, causing the touch sensitive keyboard to switch from the mouse mode to the typing mode.

21. The method of claim 19, wherein the determination that the one or more key depressions results in the tap when switching to the mouse mode further includes determining that the one or more key depressions include a tapping of an arbitrary combination of the plurality of keys on the touch sensitive keyboard to cause the touch sensitive keyboard to switch from the typing mode to the mouse mode.

22. The method of claim 19, wherein the determination that the one or more key depressions results in the tap when switching to the mouse mode further includes determining that the one or more key depressions include a tapping of a predetermined number of the plurality of keys on the touch sensitive keyboard to cause the touch sensitive keyboard to switch from the typing mode to the mouse mode.

23. The method of claim 22, wherein the predetermined number of the plurality of keys on the touch sensitive keyboard comprise adjacent keys on the touch sensitive keyboard.

24. The method of claim 19, wherein the determination that the one or more key depressions results in the tap when switching to the mouse mode further includes determining that the one or more key depressions include a tapping of a dedicated key on the touch sensitive keyboard.

* * * * *